United States Patent
Nam et al.

(10) Patent No.: US 8,398,904 B2
(45) Date of Patent: Mar. 19, 2013

(54) MICROCELLULAR FOAM OF THERMOPLASTIC RESIN PREPARED WITH DIE HAVING IMPROVED COOLING PROPERTY AND METHOD FOR PREPARING THE SAME

(75) Inventors: Kyung-Gu Nam, Daejeon (KR);
Ki-Deog Choi, Daejeon (KR);
Jong-Sung Park, Daejeon (KR);
Seon-Mo Son, Daejeon (KR);
Bong-Keun Lee, Daejeon (KR);
Kyung-Jip Min, Seoul (KR)

(73) Assignee: LG Chem, Ltd. (KR)

( * ) Notice: Subject to any disclaimer, the term of this patent is extended or adjusted under 35 U.S.C. 154(b) by 93 days.

(21) Appl. No.: 12/851,131

(22) Filed: Aug. 5, 2010

(65) Prior Publication Data
US 2010/0311853 A1    Dec. 9, 2010

Related U.S. Application Data

(62) Division of application No. 11/442,844, filed on May 30, 2006, now abandoned.

(30) Foreign Application Priority Data

Nov. 30, 2005  (KR) .................. 10-2005-0115637
Nov. 30, 2005  (KR) .................. 10-2005-0115638

(51) Int. Cl.
*B29D 7/00*      (2006.01)
*B29C 44/00*    (2006.01)
*B29C 44/28*    (2006.01)
*B29C 47/00*    (2006.01)
*B29C 47/78*    (2006.01)

(52) U.S. Cl. ....... 264/45.9; 264/41; 264/45.1; 264/46.1; 264/50; 264/51; 521/79

(58) Field of Classification Search .................. 521/79; 264/41–55
See application file for complete search history.

(56) References Cited

U.S. PATENT DOCUMENTS

| 3,275,179 A | 9/1966 | Lux et al. |
| 4,022,715 A | 5/1977 | Bornfriend |
| 4,096,218 A | 6/1978 | Yasuike et al. |

(Continued)

FOREIGN PATENT DOCUMENTS

| GB | 627800 | 8/1949 |
| GB | 632955 | 12/1949 |

(Continued)

OTHER PUBLICATIONS

Grohens et al. "Glass Transition of Stereoregular Poly(methyl methacrylate) at Interfaces." 1998. Langmuir, The ACS Journal of Surfaces and Colloids. vol. 14, No. 11. pp. 2929-2932.*

(Continued)

*Primary Examiner* — Randy Gulakowski
*Assistant Examiner* — Kara Boyle
(74) *Attorney, Agent, or Firm* — Cantor Colburn LLP

(57) ABSTRACT

The present invention relates to a microcellular foam of a thermoplastic resin and a method for preparing the same, and more particularly to a microcellular foam comprising a skin layer having a porosity of below 5% and a core layer having a porosity of at least 5%, wherein the thickness of the skin layer accounts for 5 to 50% of the entire foam, and a method for preparing the same. The microcellular foam of the present invention is advantageous in that it has a thicker skin layer and smaller and uniform micropores in the core layer, compared with conventional microcellular foams, while having mechanical properties comparable to those of conventional non-foamed sheets.

17 Claims, 5 Drawing Sheets

U.S. PATENT DOCUMENTS

| | | | |
|---|---|---|---|
| 4,473,665 A | 9/1984 | Martini-Vvedensky et al. | |
| 5,158,986 A | 10/1992 | Cha et al. | |
| 5,548,053 A | 8/1996 | Weidner et al. | |
| 5,656,555 A | 8/1997 | Cho | |
| 5,866,053 A | 2/1999 | Park et al. | |
| 6,225,365 B1 | 5/2001 | Zerafati et al. | |
| 6,232,354 B1 | 5/2001 | Tan | |
| 6,310,112 B1 | 10/2001 | Vo et al. | |
| 6,391,931 B1 * | 5/2002 | Gehlsen et al. | 521/50 |
| 2003/0134104 A1 | 7/2003 | Hokkirigawa et al. | |
| 2005/0058824 A1 * | 3/2005 | Fujimoto | 428/316.6 |

FOREIGN PATENT DOCUMENTS

| | | | |
|---|---|---|---|
| GB | 746193 | | 3/1956 |
| GB | 2 125 423 A | | 3/1984 |
| JP | 5295270 | | 11/1993 |
| JP | 6248085 | | 9/1994 |
| JP | 08-11190 | * | 1/1996 |
| JP | 08011190 | | 1/1996 |
| JP | 19960021466 | | 7/1996 |
| JP | 11077737 A | | 3/1999 |
| JP | 2000167903 | | 6/2000 |
| JP | 2003231148 | | 8/2003 |
| JP | 2003313351 | | 11/2003 |
| JP | 2004322341 | | 11/2004 |
| JP | 2004338396 | | 12/2004 |
| KR | 1020040034975 | | 4/2004 |
| TW | 09001579 | | 1/1997 |
| TW | 424039 | | 3/2001 |
| TW | 438848 | | 6/2001 |
| TW | 466252 | | 12/2001 |

OTHER PUBLICATIONS

PolymerProcessing.com. "Polycarbonate Information and Properties." 2001.*
PCT International Search Report for International application No. PCT/KR2006/001957; Date of mailing Apr. 15, 2008.
PCT written opinion of the international searching authority for international application No. PCT/KR2006/001957; Date of mailing Apr. 15, 2008.
PCT International Search Report for the International application No. PCT/KR03/00634; International Filing date: Mar. 28, 2003; Date of Mailing: Aug. 12, 2003.
PCT International Preliminary Examination Report; International application No. PCT/KR2003/00634; International Filing date: Mar. 28, 2003; Date of Completion: Jul. 28, 2004.

* cited by examiner

MICROCELLULAR FOAM OF THERMOPLASTIC RESIN PREPARED WITH DIE HAVING IMPROVED COOLING PROPERTY AND METHOD FOR PREPARING THE SAME

CROSS REFERENCES TO RELATED APPLICATION

This application is a divisional of U.S. patent application Ser. No. 11/442,844, filed May 30, 2006, which claims priority to Korean Patent Application Nos. 10-2005-0115637 and 10-2005-0115638, both filed in the Korean Industrial Property Office on Nov. 30, 2005, and all the benefits accruing therefrom under 35 U.S.C. §119, the contents of which are incorporated herein by reference in their entirety.

FIELD OF THE INVENTION

The present invention relates to a microcellular foam of a thermoplastic resin and a method for preparing the same, and more particularly, to a microcellular foam of a thermoplastic resin having a low specific gravity but mechanical properties comparable to those of conventional non-foamed sheets and a method for preparing the same.

BACKGROUND OF THE INVENTION

Foams used for thermal insulation, sound absorption, buoyancy, elasticity, weight reduction, soundproofing, etc. in soundproofing materials, heat insulating materials, construction materials, lightweight structural frames, packing materials, insulating materials, cushions, vibration-proof materials, shoes, etc., are produced by using physical or chemical foaming agents.

Examples of physical foaming agents are carbon dioxide, nitrogen, hydrofluorocarbon, etc., and examples of chemical foaming agents are gas-producing organic materials like azodicarbonamide.

According to U.S. Pat. No. 6,225,365, superior foams can be obtained with physical foaming agents, with no residue at all, whereas chemical foaming agents leave residues in the foam after their decomposition. However, the resultant foams tend to have poor mechanical strength and toughness because of their large pore size (about 100 μm or larger) and high porosity (about 50% or higher).

In order to solve this problem, microcellular foams having large pore density and small pore size were developed as disclosed in U.S. Pat. No. 4,473,665.

Many other methods for continuously producing foams having microstructure have been proposed. U.S. Pat. No. 5,866,053 discloses a continuous process for producing microcellular foams, characterized in that a nucleated stream is created by rapidly lowering the pressure of a single-phase solution comprising a foaming agent and a polymer, and in which the rate of nucleation is maintained sufficiently high to obtain a microcellular structure in the final product.

Korean Patent Publication No. 2004-34975 discloses a method of producing microporous fibers characterized by the steps of preparing a single-phase polymer melt-gas solution with a uniform concentration by melting a fiber-forming polymer in an extruder and feeding a supercritical gas into the extruder, preparing microporous materials through a rapid pressure drop, rapidly cooling the microporous materials with a coolant, and rolling the resultant fiber at a rate of 10 to 6,000 m/min, so that the spinning draft becomes 2 to 300.

Japanese Patent No. 3,555,986 discloses a method of producing thermoplastic resin foams having fine and uniform micropores comprising the steps of impregnating an inert gas or a foaming agent into a thermoplastic resin which has been melted by a first extruder and a mixer attached to it, cooling the melted resin while maintaining the applied pressure using a second extruder, forming many pore nuclei through a rapid pressure drop, and controlling the pore diameter uniformly.

Japanese Laid-Open Patent Publication No. 2004-322341 discloses a method of producing microcellular foams comprising the steps of melting a molding material comprising a crystalline thermoplastic resin, mixing the melted molding material with an inert fluid, and extruding the mixture of the inert fluid and the molding material at a temperature that is 0.5 to 5° C. higher than the crystallization temperature.

Japanese Laid-Open Patent Publication No. 2004-338396 discloses an extrusion foaming method of producing microcellular foams comprising the steps of melting a molding material comprising a thermoplastic resin, mixing the melted molding material with an inert fluid, extruding the mixture of the inert fluid and the molding material at a temperature that is higher than the setting temperature so that foam is not practically formed or it is formed in a small amount at the instant of extrusion, and applying an external force to the extruded molding material.

However, all the products produced from the above-mentioned patents have mechanical properties that are poorer than those of non-foamed counterparts.

SUMMARY OF THE INVENTION

The present invention was made to solve the above problems, and an object of the present invention is to provide a microcellular foam having a low specific gravity and mechanical properties that are comparable to those of a non-foamed counterpart with a thick skin layer and a controlled size and distribution of micropores in the core layer.

Another object of the present invention is to provide a method of preparing such a microcellular foam by rapidly changing the temperature when a pressure drop is finished and cooling begins to increase the thickness of the skin layer and to control the size and distribution of micropores in the core layer.

To attain the objects, the present invention provides a microcellular foam comprising a skin layer having a porosity of below 5% and a core layer having a porosity of at least 5%, wherein the thickness of the skin layer accounts for 5 to 50% of the total thickness.

The present invention also provides a method of preparing a microcellular foam comprising the steps of a) mixing a plasticized thermoplastic polymer resin with a foaming agent using an extruder, b) forming micropores by passing the plasticized mixture through a pressure drop region of an extrusion die, and c) cooling the melted mixture by passing it through a cooling region of an extrusion die, wherein a temperature difference at the end of the pressure drop region and the beginning of the cooling region is 30 to 200° C.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
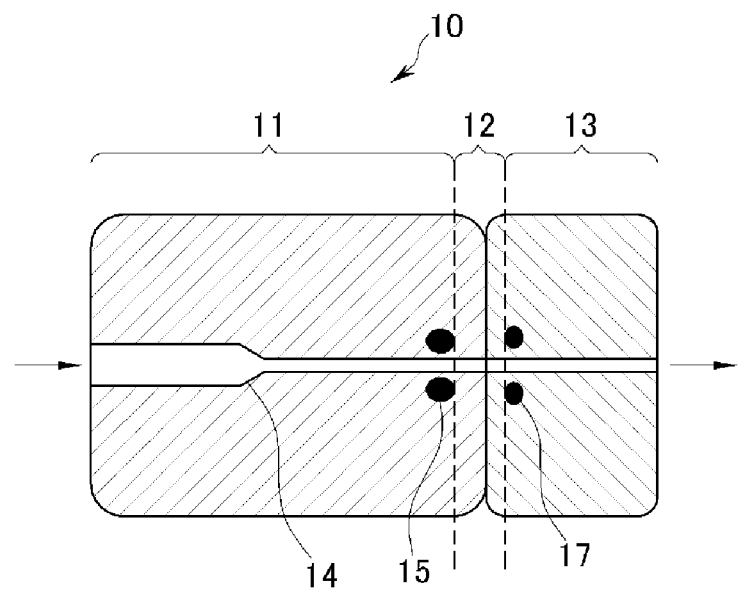
FIG. 1 is a cross-sectional view of an exemplary extrusion die comprising a pressure drop region, a temperature change region, and a cooling region.

The microcellular foam of the present invention comprises a skin layer, which is thicker than conventional microcellular foams, and a core layer in which micropores are formed. In the present invention, the porosity is calculated by Equation 1 below. The "skin layer" is defined as a portion having a porosity of below 5% and the "core layer" is defined as a portion having a porosity of at least 5%. Preferably, the core layer has a porosity of 5 to 90% in order to ensure superior mechanical properties.

$$\text{Porosity}(\%) = (\rho_N - \rho_F)/\rho_N \times 100 \quad \text{Equation 1}$$

where $\rho_N$ is the density of a non-foamed portion and $\rho_F$ is the density of a foamed portion.

Preferably, in the microcellular foam of the present invention, the thickness of the skin layer accounts for 5 to 50%, more preferably 10 to 40%, of the total thickness of the microcellular foam. If the thickness of the skin layer is less than 5% of the total thickness of the microcellular foam, such mechanical properties as elongation may be poor. In contrast, if it exceeds 50%, it is difficult to obtain a desirable decrease in specific gravity.

The shape or configuration of the microcellular foam of the present invention is not particularly limited, but it is preferable that the foam is a sheet, a "]"-shaped cross-sectional body, or a chassis having a chamber inside thereof. Since the microcellular foam can be prepared into a suitable thickness depending on the purpose, the thickness of the cross-section of the microcellular foam is not particularly limited, but a thickness of 0.5 to 5 mm is preferable.

Also, in the microcellular foam of the present invention, the skin layer preferably has an average thickness of 50 to 500 μm. If the thickness of the skin layer is smaller than 50 μm, mechanical properties may be not good. In contrast, if it exceeds 500 μm, it is difficult to obtain a desirable decrease in specific gravity.

Preferably, the microcellular foam of the present invention has an average porosity of 5 to 80% and more preferably 10 to 70%, and particularly preferable is a range from 15 to 30%. If the average porosity of the microcellular foam is below 5%, the foam cannot normally function as microcellular foam. In contrast, if it exceeds 80%, the excessive porosity may worsen physical properties of the microcellular foam.

When the average porosity of the microcellular foam ranges from 15 to 30%, it is preferable that the impact energy absorption measured by rheometric drop test according to ASTM D4226 is at least 70%, and more preferably 90 to 150%, of that of the non-foamed counterpart. Although, the higher the impact energy absorption the better, it is practically difficult to obtain an impact energy absorption higher than 150% of that of the non-foamed counterpart.

Preferably, the pores formed in the core layer of the microcellular foam have an average diameter of 0.1 to 50 μm, and more preferably 1 to 30 μm. The smaller the pore size, the more improved the physical properties of the microcellular foam. However, it is difficult to form micropores having a diameter smaller than 0.1 μm. If the average diameter of the pores exceeds 50 μm, the mechanical properties tend to be poor.

The microcellular foam of the present invention comprises a thermoplastic resin that is capable of forming foam, and it is preferably at least one polymer selected from the group consisting of an acrylonitrile-butadiene-styrene (ABS) copolymer, polycarbonate (PC), polyvinyl chloride (PVC), polystyrene (PS), polymethyl methacrylate (PMMA), polyester, polypropylene, and nylon, and it is more preferably at least one polymer selected from the group consisting of an acrylonitrile-butadiene-styrene (ABS) copolymer, polycarbonate (PC), polyvinyl chloride (PVC), and polystyrene (PS).

The microcellular foam of the present invention preferably has an elongation measured in accordance with ASTM D638 of at least 70%, and more preferably 90 to 150%, of that of the non-foamed counterpart. The larger the elongation of the foam the better, but it is practically difficult to obtain an elongation exceeding 150% of that of the non-foamed counterpart. If the elongation is less than 70% of that of the non-foamed counterpart, the foam cannot be utilized.

And, preferably, the microcellular foam of the present invention has a tensile strength measured in accordance with ASTM D638 of at least 70%, and more preferably 90 to 150%, of that of the non-foamed counterpart produced in the comparable condition. The higher the tensile strength of the microcellular foam the better, but it is practically difficult to obtain a tensile strength exceeding 150% of that of the non-foamed counterpart. If the tensile strength falls short of 70% of that of the non-foamed counterpart, the foam cannot be utilized because of poor physical properties.

The microcellular foam of the present invention may be utilized as an interior/exterior construction material, an optical reflection plate of a display device, etc. It is suitable for use as an interior/exterior construction material, particularly as a soundproofing material, a heat insulating material, a construction material, a light structural material, a packing material, an insulating material, a cushioning material, a vibration-proof material, etc.

The method of preparing a microcellular foam in accordance with the present invention comprises the steps of a) mixing a plasticized thermoplastic polymer resin with a foaming agent using an extruder, b) forming micropores by passing the plasticized mixture through a pressure drop region of an extrusion die, and c) cooling the melted mixture in which the micropores are formed by passing it through a cooling region of an extrusion die.

Preferably, the temperature difference between the end of the pressure drop region and the beginning of the cooling region is maintained at 30 to 200° C., and more preferably at 50 to 150° C. If the temperature difference is smaller than 30° C., the micropores formed in the pressure drop region continue to grow and it is difficult to obtain a skin layer that is thick enough for a foam. In contrast, if the temperature difference exceeds 200° C., rapid solidification interferes with a smooth preparation process.

The pressure drop region and the cooling region may be present in a single extrusion die or may be present in separate block-type extrusion dies. Preferably, the regions are present in a single extrusion die for efficient control of the micropores and formation of the skin layer. When the regions are present in separate extrusion dies, it is preferable that they are strongly connected, so that the pressure at the end of the pressure drop region is maintained at the cooling region.

The extrusion die may further comprise a heating means to prevent a temperature decrease at the end of the pressure drop region. The heating means may be present inside of the pressure drop region of the extrusion die or at both the inside and outside of the pressure drop region of the extrusion die.

The heating means may be a common electric heater, but is not particularly limited in the present invention.

The extrusion die may comprise a cooling means to prevent a temperature increase at the beginning of the cooling region. Like the heating means, the cooling means is also preferably present inside the cooling region of the extrusion die, but it may also be present at both the inside and outside of the cooling region of the extrusion die.

The cooling means may be a pipe in which a coolant flows, but is not particularly limited in the present invention.

FIG. 1 is a cross-sectional view of an exemplary extrusion die 10 comprising a pressure drop region 11, a temperature change region 12, and a cooling region 13. A nozzle 14 is present inside of the extrusion die 10 along the extrusion direction. The actual pressure drop occurs at the end of the nozzle.

The extrusion die comprises a heating means 15 for maintaining the pressure drop region at a specific temperature and a cooling means 17 for maintaining the temperature of the cooling region. However, the construction of the extrusion die used in the present invention is not limited to that shown in FIG. 1.

In the preparation method in accordance with the present invention, the temperature at the end of the pressure drop region may be adjusted depending on the particular thermoplastic resin used, but a temperature of 150 to 250° C. is preferable. If the temperature at the end of the pressure drop region is below 150° C., not enough micropores may be formed. In contrast, if it exceeds 250° C., deterioration of the thermoplastic resin or over-foaming may occur.

In addition, the temperature at the beginning of the cooling region may also be adjusted depending on the particular thermoplastic resin used. A temperature that is slightly higher than the melting point or softening point of the thermoplastic resin is preferable, and a temperature of 40 to 150° C. is more preferable. If the temperature at the beginning of the cooling region is below 40° C., rapid solidification may hinder a smooth preparation process. In contrast, if it exceeds 150° C., the micropores formed in the pressure drop region continue to grow in the cooling region, making it difficult to obtain a sufficiently thick skin layer.

It is particularly preferable that the temperature change of the pressure drop region and the cooling region is maintained within ±5° C., and more preferably within ±2° C. If the temperature change of the pressure drop region and the cooling region exceeds ±5° C., uniform extrusion becomes difficult, and thus it is difficult to attain good mechanical properties.

The transfer rate of the thermoplastic polymer resin in the pressure drop region and the cooling region is not particularly limited as long as normal processing is possible, but a rate of 0.5 to 20 m/min is preferable.

A temperature change region may be present between the pressure drop region and the cooling region, and a rapid temperature change occurs in the temperature change region while heat exchange between the pressure drop region and the cooling region is prevented. It is preferable that the temperature change rate in the temperature change region, which is defined in Equation 2 below, is at least 2° C./mm, more preferably from 3 to 40° C./mm. The higher the temperature change rate, the better. If the temperature change rate is below 2° C./mm, the effect of control of the micropores in the cooling region becomes only slight.

$$T_L = (T_h - T_c)/L \qquad \text{Equation 2}$$

where $T_L$ is the temperature change rate, $T_h$ is the temperature at the end of the pressure drop region, $T_c$ is the temperature at the beginning of the cooling region, and L is the length of the temperature change region.

A shorter length of the temperature change region is favored since more abrupt temperature change is possible, but a length of 1 to 150 mm is preferable. If the length of the temperature change region exceeds 150 mm, temperature change between the pressure drop region and the cooling region becomes gradual and it is not good for preparation of the microcellular foam.

Preferably, the pressure drop region, the temperature change region, and the cooling region are present in a single extrusion die. In particular, the extrusion die preferably comprises a heating means at the end of the pressure drop region in order to prevent a temperature decrease and a cooling means at the beginning of the cooling region in order to prevent a temperature increase. Details of the heating means and the cooling means are the same as described above. The temperature change region may be defined as the region between the heating means and the cooling means.

Figure 2:
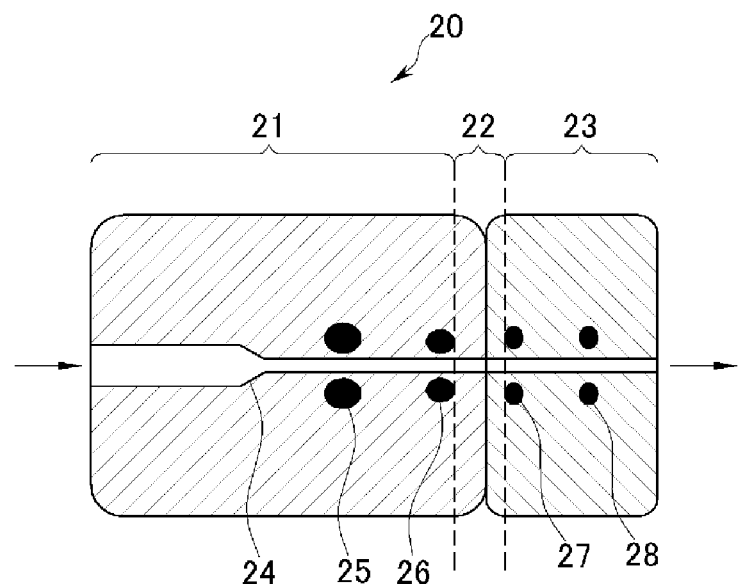
FIG. 2 is a cross-sectional view of an exemplary extrusion die comprising a pressure drop region, a temperature change region, and a cooling region along with a plurality of cooling means and heating means.

FIG. 2 is a cross-sectional view of an extrusion die 20 in which a plurality of heating means 25, 26 and cooling means 27, 28 have been added to enhance the effect of the heating means and the cooling means. It is also preferable that the pressure drop region 21, the temperature change region 22, and the cooling region 23 are present in a single die. However, separate block-type extrusion dies may be used as long as the internal pressure is maintained. A nozzle 24 is located inside of the extrusion die 20 along the extrusion direction.

The heating means and the cooling means may be added as required. The construction of the extrusion die used in the preparation method in accordance with the present invention is not limited to that shown in FIG. 2.

The thermoplastic polymer resin may be any thermoplastic resin that is capable of forming foam. Preferably, it comprises at least one polymer selected from the group consisting of an acrylonitrile-butadiene-styrene (ABS) copolymer, polycarbonate (PC), polyvinyl chloride (PVC), polystyrene (PS), polymethyl methacrylate (PMMA), polyester, polypropylene (PP), and nylon. More preferably, it comprises at least one polymer selected from the group consisting of an acrylonitrile-butadiene-styrene (ABS) copolymer, polycarbonate (PC), polyvinyl chloride (PVC), and polystyrene (PS).

Preferably, the foaming agent used in the present invention is an inert gas, and is more preferably carbon dioxide, nitrogen, or a mixture thereof. Also preferably, the mixing proportion of the foaming agent to the thermoplastic resin is 3-0.1 to 97-99.9 based on weight. If the content of the foaming agent falls short of 0.1 part by weight, sufficient foaming does not occur in the pressure drop region, and thus micropores are not formed. In contrast, if it exceeds 3 parts by weight, the foam is not melted in the resin and thus becomes useless.

Preferably, the foaming agent is mixed in a supercritical state. In a supercritical state, the foaming agent has better compatibility with the polymer resin and enables formation of uniform pores inside the resin, thereby reducing pore size and increasing pore density. The foaming agent may be fed in the supercritical state or may be transformed to the supercritical state after being fed to the extruder.

For example, carbon dioxide has a critical pressure of 75.3 kgf/cm$^2$ and a critical temperature of 31.35° C. Nitrogen has a critical pressure of 34.6 kgf/cm$^2$ and a critical temperature of −147° C. In general, the transition of the gas inside the extruder to the supercritical state preferably takes place at a pressure of 70 to 400 kgf/cm$^2$ and a temperature of 100 to 400° C.

The condition for transition of nitrogen to the supercritical state can be adjusted depending on the particular foaming agent used, and is not particularly limited in the present invention.

Hereinafter, the present invention is described in further detail through examples. However, the following examples are only for the understanding of the present invention and the present invention is not limited to or by them.

EXAMPLES

Example 1

Figure 3:
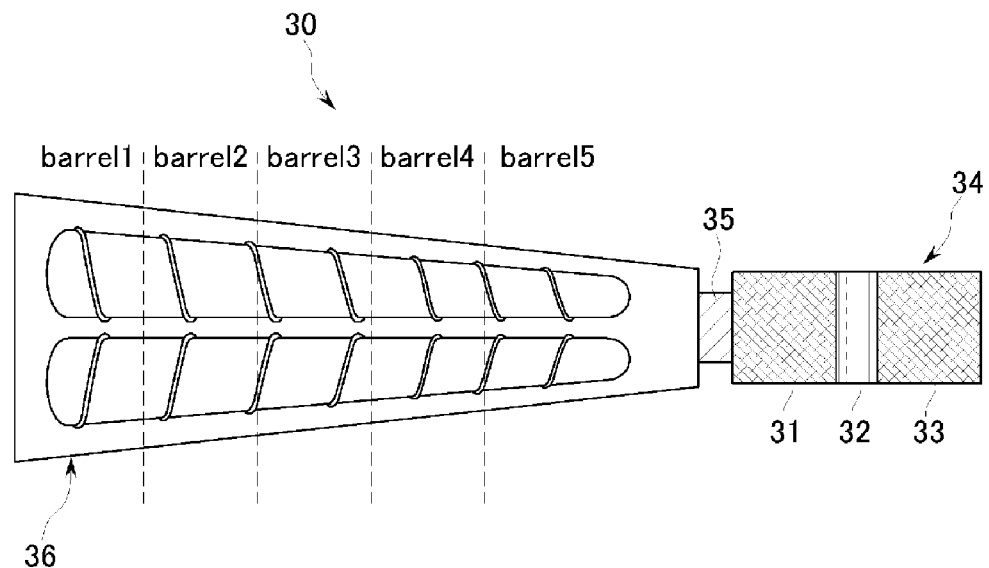
FIG. 3 is a construction diagram of an extruding apparatus for preparing the microcellular foam of the present invention.

An extrusion apparatus 30 was prepared by attaching an extrusion die 34 that is capable of temperature control, which comprises a pressure drop region 31, a temperature change region 32, and a cooling region 33, and an adapter 35, to a twin screw extruder 36 (Göttfert Extrusiometer 350), as in FIG. 3. The lengths of the pressure drop region 31, the temperature change region 32, and the cooling region 33 of the extrusion die were 125 mm, 27 mm, and 40 mm, respectively.

98 parts by weight of a rigid polyvinyl chloride (PVC) compound (LG Chem) used for interior/exterior housing and construction materials was added to the extruder. After the PVC was completely plasticized, 2 parts by weight of nitrogen was added to the barrel 4 of the extruder using a high-pressure pump. The resultant single-phase mixture was foamed to obtain a microcellular foam sheet 2 mm thick and 100 mm wide.

The temperature of the barrel 1 was maintained at 190° C., that of barrels 2 to 4 at 180° C., and that of barrel 5 at 175° C. The temperature of the adapter was maintained at 135° C.

The temperatures of the pressure drop region, the temperature change region, and the cooling region were maintained as given in Table 1 below.

Examples 2 and 3

A microcellular foam sheet was prepared in the same manner as in Example 1 except that the temperatures of the pressure drop region, the temperature change region, and the cooling region were changed as given in Table 1.

Example 4

A microcellular foam sheet was prepared in the same manner as in Example 1 except that the temperatures of the pressure drop region, the temperature change region, and the cooling region were changed as given in Table 1, and a die that produces a 1 mm-thick sheet was used.

Comparative Example 1

Figure 4:
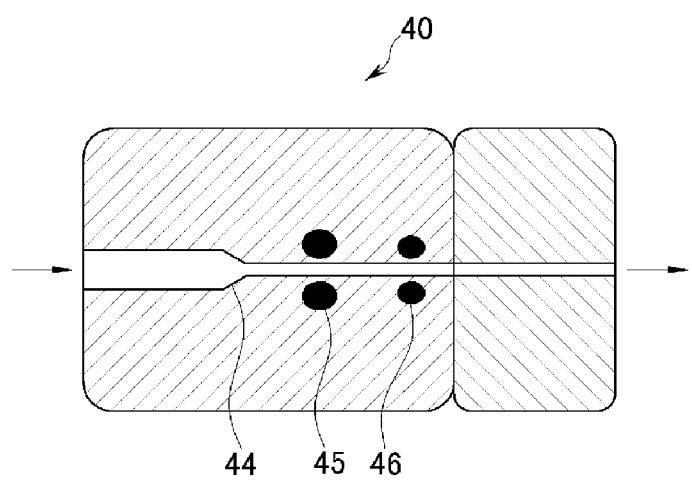
FIG. 4 is a cross-sectional view of the extrusion die used to prepare the microcellular foams of Comparative Examples 1 and 2.

A foam sheet was prepared in the same manner as in Example 1, except that a foaming agent was not used, and an extrusion die 40 comprising only a pressure drop region with a nozzle 44 and heating means 45, 46, without a temperature change region or a cooling region, was used, as shown in FIG. 4.

Comparative Example 2

A foam sheet was prepared in the same manner as in Example 1, except that an extrusion die 40 comprising only a pressure drop region with a nozzle 44 and heating means 45, 46, without a temperature change region or a cooling region, was used, as shown in FIG. 4.

Comparative Example 3

Figure 5:
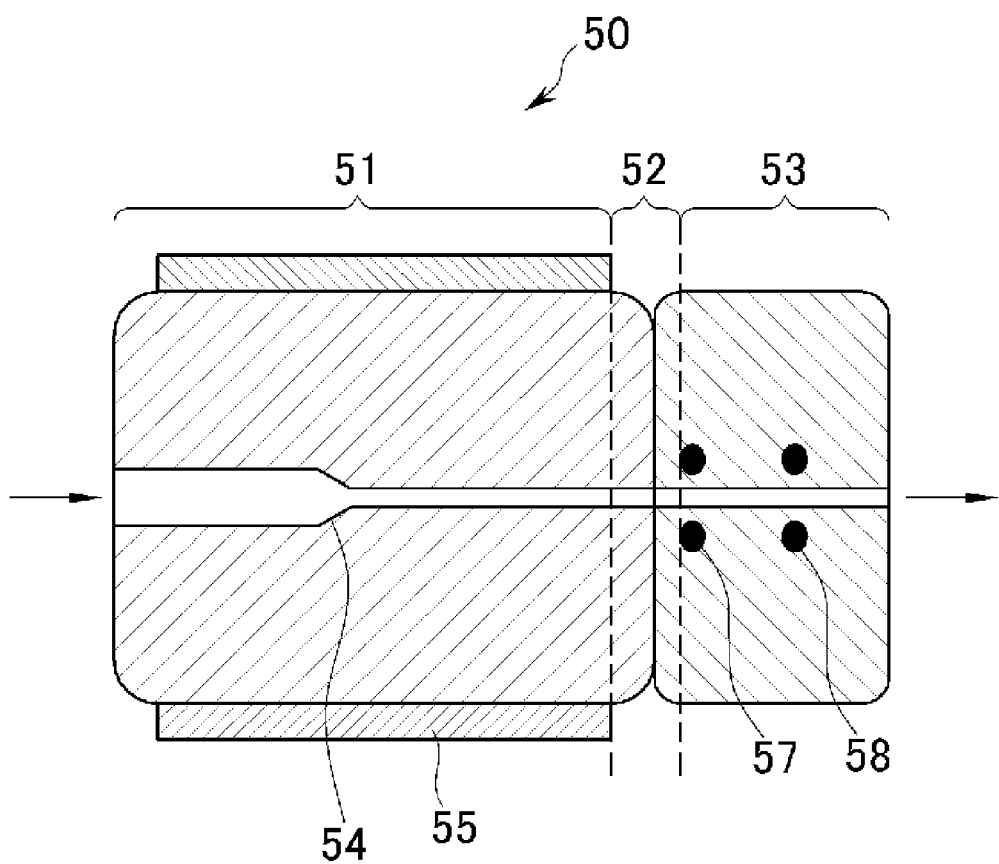
FIG. 5 is a cross-sectional view of the extrusion die used to prepare the microcellular foam of Comparative Example 3.

A foam sheet was prepared in the same manner as in Example 1, except that a foaming agent was not used, and an extrusion die 50 comprising a pressure drop region 51, a temperature change region 52, and a cooling region 53, wherein a nozzle 54 is located inside the pressure drop region, a heating means 55 is located outside of the pressure drop region, and cooling means 57, 58 are located inside of the cooling region, was used, as shown in FIG. 5.

TABLE 1

| | Temperature (° C.) | | | | | |
| | Pressure drop region | | Temperature change region | | Cooling region | |
| Position | Beginning | End | Beginning | End | Beginning | End |
|---|---|---|---|---|---|---|
| Example 1 | 165 | 165 | 165 | 52 | 52 | 50 |
| Example 2 | 175 | 175 | 175 | 45 | 45 | 43 |
| Example 3 | 160 | 160 | 160 | 50 | 50 | 50 |
| Example 4 | 177 | 177 | 177 | 77 | 77 | 74 |
| Comparative Example 1 | 180 | 180 | — | — | — | — |
| Comparative Example 2 | 180 | 180 | — | — | — | — |
| Comparative Example 3 | 170 | 155 | 145 | 100 | 91 | 75 |

Testing Example

Physical properties of the sheets prepared in Examples 1 to 4 and Comparative Examples 1 to 3 were tested as follows. The result is given in Table 2 below.

1. Specific gravity: Specific gravity of the entire sheet was measured in accordance with ASTM D792.

2. Porosity, pore size, and thickness of skin layer: Measured using a scanning electron microscope (SEM) along the cross-section of the sheet.

Figure 6:
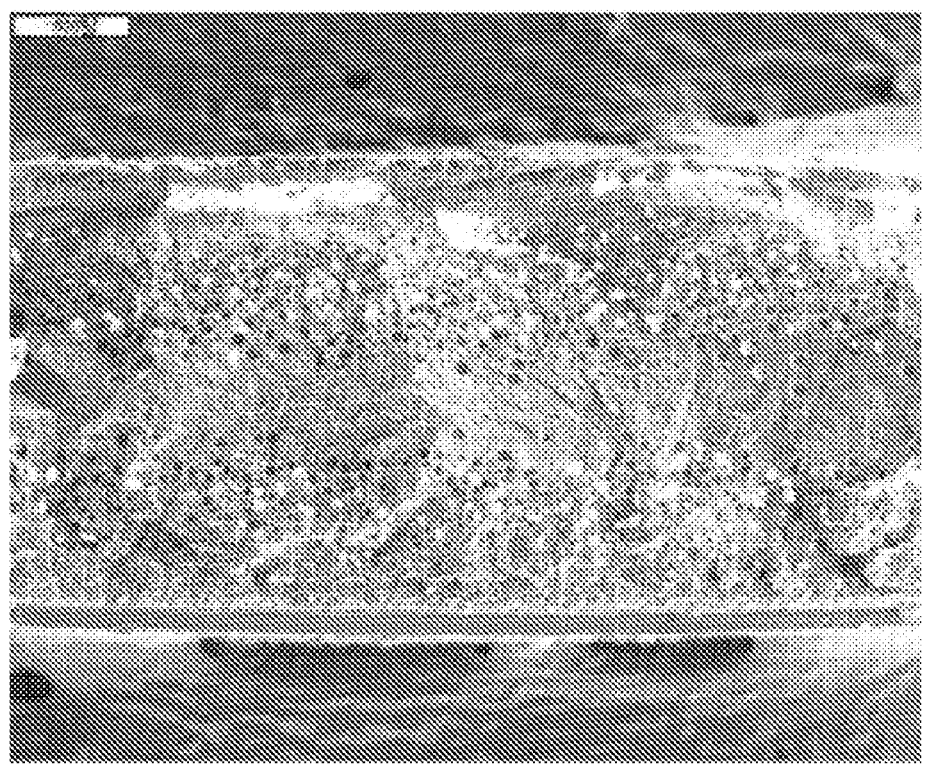
FIG. 6 is a scanning electron micrograph showing the cross-section of the microcellular foam sheet of Example 1.
Figure 7:
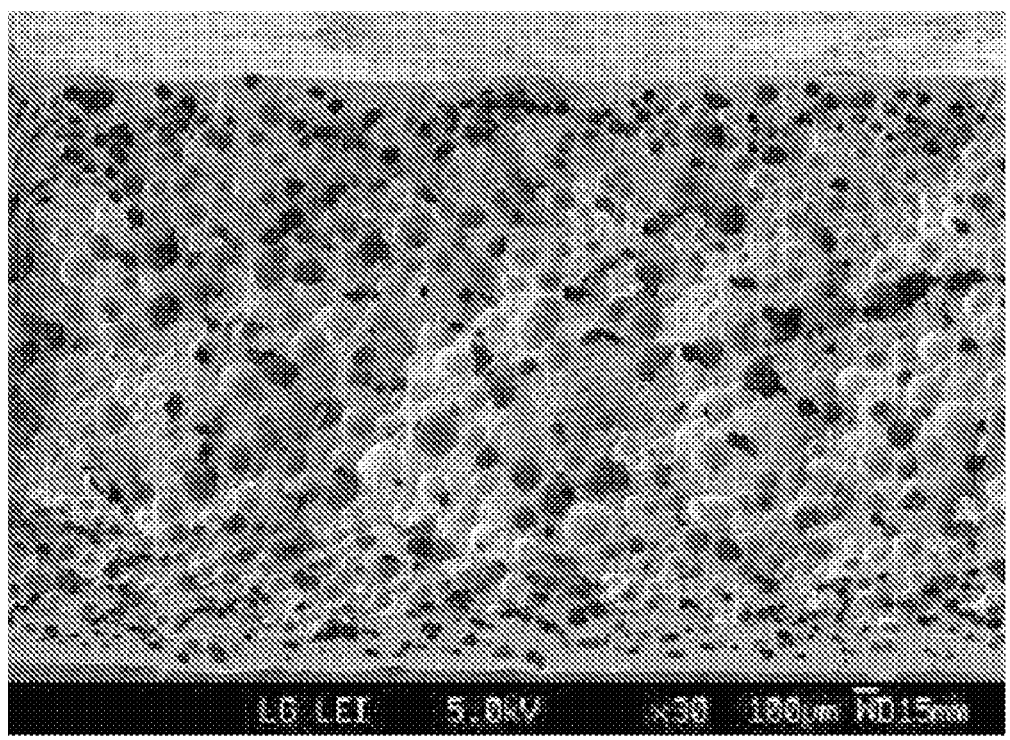
FIG. 7 is a scanning electron micrograph showing the cross-section of the foam sheet of Comparative Example 3.

FIG. 6 is a scanning electron micrograph showing the cross-section of the microcellular foam sheet of Example 1, and FIG. 7 is a scanning electron micrograph showing the cross-section of the foam sheet of Comparative Example 3.

3. Tensile strength and elongation: Measured in accordance with ASTM D638.

4. Impact resistance: Impact absorption energy was measured by the rheometric drop test (RDT) in accordance with ASTM D4226.

TABLE 2

| | Example 1 | Example 2 | Example 3 | Example 4 | Comp. Example 1 | Comp. Example 2 | Comp. Example 3 |
|---|---|---|---|---|---|---|---|
| Specific gravity | 1.2 | 1.14 | 1.2 | 1.15 | 1.4 | 1.0 | 1.0 |
| Thickness of skin layer (μm) | 300 | 300 | 200 | 150 | — | <50 | <50 |
| Average pore size (μm) | 30 | 20 | 25 | 30 | — | 126 | 60 |
| Elongation (%) | 136 | 150 | 136 | 112 | 130 | 24 | 42 |
| Tensile strength (N/mm$^2$) | 40 | 43 | 41 | 44 | 44 | 23.9 | 36 |
| Impact absorption energy (J) | 12 | 13 | 11 | 8 | 15.2 | 1.2 | 3.3 |

As seen in Table 2, the microcellular foams prepared in accordance with the present invention have a fine and uniform pore size, as seen in FIG. 6. Also, since they have a thick skin layer, they show physical properties comparable to those of non-foamed sheets, in spite of a low specific gravity. In contrast, the foamed sheets without a cooling region or produced through a smooth cooling treatment have a large pore size, as seen in FIG. 7, and a thin skin layer.

As is apparent from the above description, the microcellular foam of the present invention is advantageous in that it has a thicker skin layer and smaller and uniform micropores, compared with conventional microcellular foams, while having mechanical properties comparable to those of non-foamed counterparts.

Although the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A preparation method of a microcellular foam comprising the steps of:
    a) mixing a plasticized thermoplastic polymer resin with a foaming agent using an extruder;
    b) forming micropores by passing the plasticized mixture through a pressure drop region; and
    c) cooling the melted mixture in which the micropores have been formed by passing it through a cooling region,
    wherein a temperature change region is between the pressure drop region and the cooling region,
    wherein the temperature at the beginning of the temperature change region is 160 to 177° C., and the temperature at the end of the temperature change region is 45 to 77° C.;
    wherein a temperature difference at the end of the pressure drop region and the beginning of the cooling region is 30 to 200° C.;
    wherein the temperature at the end of the pressure drop region is 150 to 250° C., and the temperature at the beginning of the cooling region is 40 to 150° C.;
    the temperature changes from the beginning to the end of the pressure drop region and the temperature changes from the beginning to the end of the cooling region are maintained to be within ±5° C.
    the microcellular foam comprises a skin layer having porosity of below 5% and a core layer having porosity of at least 5%, which is defined in Equation 1 below, and the thickness of the skin layer accounts for 5 to 50% of the entire thickness of the foam:

$$\text{Porosity}(\%) = (\rho_N - \rho_F)/\rho_N \times 100 \qquad \text{[Equation 1]}$$

where $\rho_N$ is the density of a non-foamed portion and $\rho_F$ is the density of a foamed portion; and
    wherein the core layer has pores having an average diameter of 0.1 to 30 μm; the overall porosity of the foam is from 15 to 30%; and the impact absorption energy of the foam measured by a rheometric drop test in accordance with ASTM D4226, the elongation of the foam measured in accordance with ASTM D638, the tensile strength of the foam measured in accordance with ASTM D638 are at least 70% of that of a non-foamed counterpart prepared under comparable conditions, respectively.

2. The preparation method of claim 1, wherein the extrusion die comprises a heating means at the end of the pressure drop region for preventing a temperature decrease.

3. The preparation method of claim 1, wherein the extrusion die comprises a cooling means at the beginning of the cooling region for preventing a temperature increase.

4. The preparation method of claim 1, wherein the temperature at the beginning of the pressure drop region is 160 to 177° C., and the temperature at the end of the pressure drop region is 160 to 177° C.

5. The preparation method of claim 1, wherein the temperature at the beginning of the cooling region is 45 to 77° C., and the temperature at the end of the cooling region is 43 to 74° C.

6. The preparation method of claim 1, wherein the temperature changes from the beginning to the end of the pressure drop region and the temperature changes from the beginning to the end of the cooling region are maintained to be.

7. The preparation method of claim 1, wherein the flow rate of the thermoplastic polymer resin in the pressure drop region is 0.5 to 20 m/min and the flow rate of the thermoplastic polymer resin in the cooling region is 0.5 to 20 m/min.

8. The preparation method of claim 1, wherein a temperature change region is further present between the pressure drop region and the cooling region, and the temperature change rate defined by Equation 2 below at the temperature change region is 2 to 40° C./mm:

$$T_L = (T_h - T_c)/L \qquad \text{[Equation 2]}$$

where $T_L$ is the temperature change rate, $T_h$ is the temperature at the end of the pressure drop region, $T_c$ is the temperature at the beginning of the cooling region, and L is the length of the temperature change region.

9. The preparation method of claim 8, wherein the length of the temperature change region is 1 to 150 mm.

10. The preparation method of claim 1, wherein the thermoplastic polymer resin comprises at least one polymer selected from the group consisting of an acrylonitrile-butadiene-styrene (ABS) copolymer, polycarbonate (PC), polyvinyl chloride (PVC), polystyrene (PS), polymethyl methacrylate (PMMA), polyester, polypropylene, and nylon.

11. The preparation method of claim 1, wherein the cross-sectional thickness of the microcellular foam is from 0.5 to 5 mm.

12. The preparation method of claim 1, wherein the skin layer has an average thickness of 50 to 500 μm.

13. The preparation method of claim 1, wherein the impact absorption energy of the microcellular foam measured by a rheometric drop test in accordance with ASTM D4226 is 8 J to 13 J.

14. The preparation method of claim 1, wherein the elongation of the microcellular foam measured in accordance with ASTM D638 is 112% to 150%.

15. The preparation method of claim 1, wherein the tensile strength of the microcellular foam measured in accordance with ASTM D638 is 40 N/mm² to 44 N/mm².

16. The preparation method of claim 1, wherein the specific gravity of the microcellular foam is 1.14 to 1.2.

17. The preparation method of claim 1, wherein the impact absorption energy of the microcellular foam measured by a rheometric drop test in accordance with ASTM D4226, the elongation of the microcellular foam measured in accordance with ASTM D638, the tensile strength of the microcellular foam measured in accordance with ASTM D638 are 90 to 150% of that of a non-foamed counterpart prepared under comparable conditions, respectively.

\* \* \* \* \*